United States Patent [19]
Demers et al.

[11] 4,228,782
[45] Oct. 21, 1980

[54] SYSTEM FOR REGULATING THE APPLIED BLADE-TO-BOULE FORCE DURING THE SLICING OF WAFERS

[75] Inventors: Robert R. Demers, Lawrenceville; Marvin A. Leedom, Princeton, both of N.J.

[73] Assignee: RCA Corporation, New York, N.Y.

[21] Appl. No.: 940,751

[22] Filed: Sep. 8, 1978

[51] Int. Cl.³ .............................................. B28D 1/04
[52] U.S. Cl. ..................... 125/14; 51/73 R; 51/165.92
[58] Field of Search .............. 51/165 B, 165.77, 165.8, 51/165.92, 73 R, 135; 125/13, 16 R, 14

[56] References Cited
U.S. PATENT DOCUMENTS

| | | | |
|---|---|---|---|
| 2,648,176 | 8/1953 | Zimmerman | 51/135 |
| 3,039,235 | 6/1962 | Heinrich | 51/73 R |
| 3,274,738 | 9/1966 | Kuniholm | 51/165.92 |
| 3,589,077 | 6/1971 | Lenning | 51/165.92 |
| 3,698,138 | 10/1972 | Wada | 51/165.8 |
| 3,724,138 | 4/1973 | Isbikawa | 51/165.8 |
| 3,728,826 | 4/1973 | Wada | 51/165.77 |
| 3,777,441 | 12/1973 | Kurimoto | 51/165.77 |
| 3,913,277 | 10/1975 | Hahn | 51/165.92 |
| 4,023,084 | 5/1977 | Owa | 51/165.77 |
| 4,107,883 | 8/1978 | Bein | 51/165.92 |

Primary Examiner—Harold D. Whitehead
Attorney, Agent, or Firm—H. Christoffersen; D. S. Cohen; R. Ochis

[57] ABSTRACT

A system for controlling the blade-to-boule feedrate of a wafer cutting saw to regulate the blade-to-boule force in accordance with predetermined criteria and for monitoring the cutting efficiency of the blade and determining when the blade needs to be dressed to increase its cutting efficiency. A constant blade-to-boule force is preferred.

16 Claims, 6 Drawing Figures

SYSTEM FOR REGULATING THE APPLIED BLADE-TO-BOULE FORCE DURING THE SLICING OF WAFERS

BACKGROUND OF THE INVENTION

1. Field of the Invention

The invention relates to the field of sawing semiconductor wafers from a boule and more particularly to saw feed control systems.

2. Prior Art

Silicon wafers are sliced from monocrystalline silicon boules using wafer saws, lapped to remove saw damage such as gouges and surface unevenness, and etched to remove any surface damage caused by or not removed by the lapping, all prior to beginning device fabrication.

If as-sawn wafers could be made flat enough and smooth enough that the lapping step could be eliminated, wafer production would be simpler and more economical. In order to achieve this goal, improvements are needed in the present wafer sawing process to provide much smoother as-sawn wafers.

Semiconductor wafer slicing saws are known which feed the saw blade into the boule at a constant linear displacement per unit time throughout the sawing of a wafer from a boule. Such systems are either inefficient or harmful because they cannot be fully efficient near the edge of the boule where the initial slicing begins without feeding the saw blade too fast ner the center of the boule.

U.S. Pat. No. 3,039,235 to Heinrich discloses a saw control system designed to eliminate this dichotomy by varying the rate of feed of the saw blade in a predetermined pattern which causes the material of the boule to be removed at a constant rate (in grams per minute) independent of the degree of penetration of the saw into the boule. This system is more efficient than constant feedrate systems. However, we have now found that, in fact, this system does not consistently provide either optimum efficiency or the highest quality wafers.

These prior art saw control systems provide no accurate, reproducible means for determining when the cutting efficiency of the saw blade has diminished to the point where the saw blade should be dressed, or replaced if dressing is not effective.

SUMMARY OF THE INVENTION

The invention improves the as-sawn quality of wafers sliced from a boule by monitoring the force which urges the saw blade into the boule and by adjusting the blade-into-the-boule feedrate to regulate this force in accordance with a predetermined schedule. A constant force is preferred. The time it takes to cut a wafer utilizing this control system is a measure of the condition of the cutting edge of the saw blade. When the wafer slicing time exceeds a predetermined threshold, the blade may be automatically characterized and enunciated as being in need of dressing or replacement. Other dressing criteria may be used.

DETAILED DESCRIPTION OF PREFERRED EMBODIMENT

Wafer sawing has been a wafer forming step rather than a wafer finishing step because the single pass of a wafer saw which creates a wafer does not remove sawing-induced blemishes and defects and it has been necessary to lap each wafer to produce a device quality surface thereon. The present invention greatly improves the as-sawn quality of wafers, reduces the amount of lapping needed to produce a device quality surface on the wafer and raises the possibility of eliminating the lapping step from the wafer preparation process.

The flatter and smoother the surface of an as-sawn wafer is, the higher is the quality of the wafer surface and the less lapping must be done to produce a planar, device quality, surface on the wafer. The greater smoothness of high quality wafers has the further advantage of increasing the strength of the wafer and reducing handling-induced breakage. Ideally, the as-sawn quality of the wafer surface (often referred to simply as the wafer quality) should be high enough that no lapping is needed and a short chemical etch to remove mechanical surface damage yields a wafer having a planar, device quality surface and having maximum strength for its thickness.

We have found that the as-sawn wafer quality is strongly influenced by the amount of force with which the saw blade is pressed against the boule during wafer slicing. A relatively low blade-to-boule force produces high quality wafers which are flatter and freer of scoring and scratching than those which are cut using a high blade-to-boule force. A low blade-to-boule force results in shallower scores and scratches than a high blade-to-boule force does.

The cutting edge of the blade of a wafer saw deteriorates with use and as it does so the cutting efficiency of the blade decreases. The cutting efficiency of the saw blade is directly related to the number of grams of silicon removed by the blade per minute when the blade-to-boule force has a specified value and the saw is rotating at a given rate.

Figure 1:
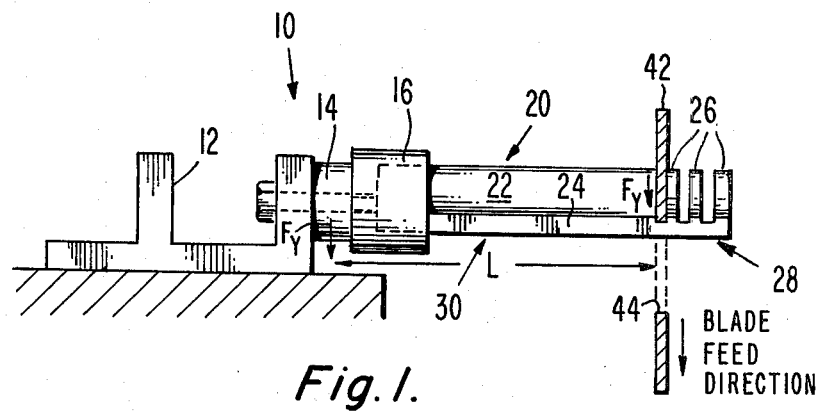
FIG. 1 illustrates one position for mounting the force sensor utilized by the invention.

A preferred semiconductor boule mounting system in accordance with the invention is illustrated generally at 10 in FIG. 1 and comprises a wafer chuck 16 attached to a mounting block 12 by a force transducer 14. Wafer chuck 16 supports an ingot 20 comprising a silicon boule 22 and a binding material 24 which holds the invdividual wafers 26 together as a single unit after slicing, even though the silicon 22 is cut all the way through as each wafer is sliced. An annular saw blade 40 having an outer periphery 42 and a diamond cutting edge on its inner periphery 44 is illustrated in cutting position after completing the sawing of a wafer. During the sawing of a wafer, the boule 22 is held stationary while the saw blade revolves in the plane of the blade about its center and is translated in the plane of the blade to advance the cutting edge of the blade through the boule. Throughout the cutting of each wafer it is desired to regulate the blade-to-boule force $F_y$ which is applied by the saw blade 40 to the boule 22 of wafer material being cut. The force $F_y$ is in the plane of the saw blade 40 and is referred to as the blade-to-boule force. The moment arm of the blade-to-boule force $F_y$ about the force transducer 14 will be substantially greater when wafers are being sliced at the free end 28 of the silicon boule than it will be when wafers are being sliced at the chuck end 30 of the silicon boule. Consequently, in order to accurately regulate the blade-to-boule force $F_y$ a force transducer 14 must be selected whose response is relatively independent of the moment arm L of the force $F_y$ about the transducer 14, or the control system must be supplied with knowledge of the length of the moment arm L and must use that moment arm in its control equation to compensate for the wafer to wafer change in the moment arm L. A transducer whose response is relatively insensitive to moment arm L is the Quartz Load Washer #9063 sold by Kistler Instrument Company. In general, this transducer will provide an accurate force measurement within about 10% of the actual force, independent of moment arm length. At present, this is considered to be accurate enough to allow wafers to be sliced whose quality is substantially improved over that of wafers produced using the prior art saw feed systems. The decreasing weight of the boule caused by the removal of the material which originally occupied the kerf area can be compensated by zeroing the force measuring system before beginning each cut.

When slicing three inch silicon wafers with an STC saw having an annular blade with a 16.5 inch outer diameter and a 6.0 inch inner diameter, a metal thickness of 4 mils and a cutting edge having a nominal width of 12 mils and made of minute diamonds in a matrix of nickel, we have found that a blade-to-boule force of from 0.75 pounds to 2.0 pounds yields good quality wafers. Blade-to-boule forces in this range are sufficient to provide rapid wafer slicing when the cutting edge of the saw blade is in good condition, but are low enough that they do not distort the blade enough to be the presently limiting factor in obtaining high quality wafers. Less force increases the time it takes to slice a wafer, but may need to be used when other quality limiting factors are improved. Excessive blade-to-boule force distorts the blade and causes it to deflect out of plane and score and gouge the wafer surface, thus reducing wafer quality.

The maximum saw-to-boule force which should be used for cutting high quality wafers depends on the characteristics of the blade such as blade thickness, blade rigidity, and blade tendency to wobble, flex and deflect out of plane in response to the applied blade-to-boule force. Consequently, to obtain optimum results, the force to be utilized should be experimentally determined. Since the distortion of the blade with increasing blade-to-boule force is a gradual process (with reasonable forces) the maximum force to be used is a matter of judgment and possibly a compromise between speed and quality. A blade-to-boule force of 1.75 pounds is preferred. A force of 4.0 pounds produces wafers of decidedly lower quality. When the blade-to-boule forces are maintained in the 0.75 pound to 2.0 pound range which is considered preferable, the force exerted on the blade is below the force level at which significant elastic deformation of the blade takes place during the sawing of a wafer and is well below the value at which any permanent deformation or other damage to the blade will occur. An optimum force pattern and magnitude for maximum wafer quality and maximum wafer output per hour has not been determined. At present, there are other factors which limit wafer quality and the determination of optimum force conditions must wait until these other factors are improved.

Figure 2A:
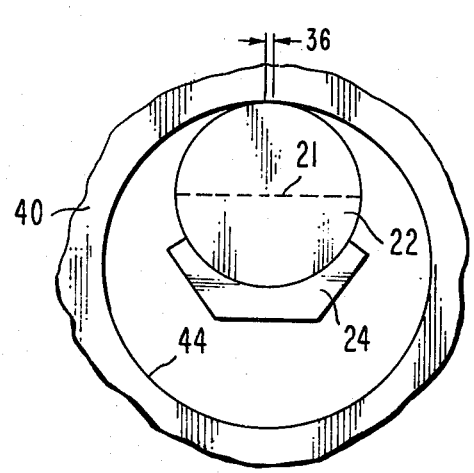
FIGS. 2a and 2b illustrate different saw positions in slicing of a wafer.
Figure 2B:
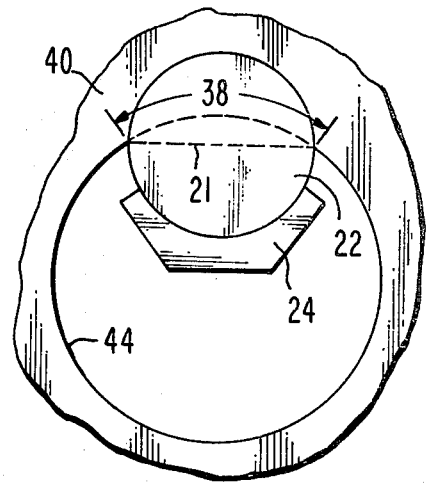

For a constant-force feed system, the pressure on the cutting edge of the saw is at a maximum when the saw has just begun its cut because of the very small contact area. In FIG. 2a the inner periphery 44 (the cutting edge) of the saw blade 40 has just begun to cut the material of the boule 22 and the contact arc 36 (between the blade and the boule) is very short. For a constant force feed, the pressure decreases steadily after the initial contact until the contact area (or the length of the contact arc) reaches a maximum—that point where a diameter of the boule constitutes a chord of the circle defined by the cutting edge 44 of the blade, see FIG. 2b where the maximum length contact arc is identified by numeral 38. Thereafter, the pressure on the cutting edge increases as the contact area decreases with further penetration.

The presently preferred force regulation schedule is a predetermined constant blade-to-boule force throughout the wafer slicing cycle, with the exception of the cutting of the initial and final edges of the wafer where the force selection is overriden by a maximum rate-of-feed limitation which is intended to prevent excessive shock and too rapid penetration of the boule surface on initial contact between the saw and the boule. Too rapid penetration of the boule surface causes the exertion of high pressures on the cutting edge of the blade and mechanically shocks the boule and can damage the saw, inter alia by prematurely dislodging diamonds from the cutting edge, and can damage the boule, inter alia by fracturing the surface so that it becomes chipped. When other factors limiting wafer quality are improved, a saw feedrate which controls the blade-to-boule pressure during the initial and final stages of the wafer slicing cycle combined with control of the blade-to-boule force during the medial stage of the cycle may prove to be more efficient than the simpler, presently preferred, scheduled constant force with its maximum feedrate limitation. In the most general case, the blade-to-boule force regulation can be preprogrammed as a function of whatever variables are desired, the most apparent of which is the extent of blade penetration into the boule (the position of the blade), although factors such as the length of moment arm L, blade speed, blade stiffness, boule hardness and others may also be included.

Figure 3:
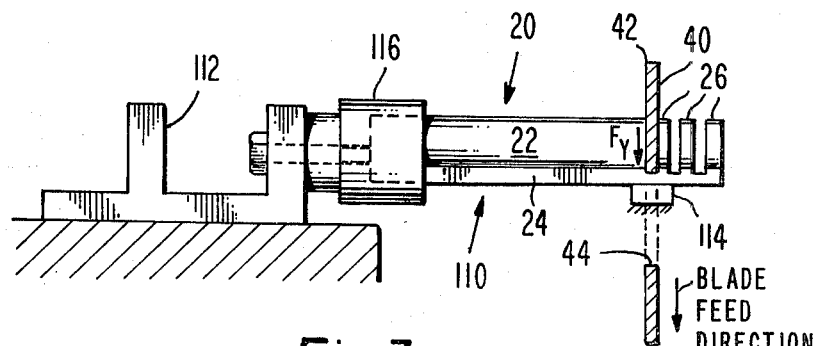
FIG. 3 illustrates an alternative position for mounting the force sensor utilized by the invention.

As an alternative to the placement of the force transducer 14 between the mounting block 12 and the wafer chuck 16, the transducer may be placed at other locations, such as directly under the boule-in line with the saw blade—as illustrated in FIG. 3. The portions of the mounting structure in FIG. 3 which are similar to portions of the structure of FIG. 1 have been given corresponding reference numerals which have the same last two digits but are less than one hundred in FIG. 1 and in the one hundreds in FIG. 3. The saw blade and boule have been given the same numbers in both figures because they are unchanged. In this embodiment, the force $F_y$ applied by the saw blade 40 to the boule 22 is transmitted directly to the force sensor 114, so long as the coupling of chuck 116 to mounting block 112 is sufficiently flexible to allow the blade force to be transmitted to transducer 114. This mounting technique has the advantage of allowing the moment arm to be ignored (to be assumed to be zero), for purposes of the force measurement. However, placing a force transducer in the position occupied by transducer 114 in FIG. 3 can be difficult if not impossible to arrange on many existing wafer saws. It is for this reason, that the embodiment of FIG. 1 is preferred. The embodiment of FIG. 1 is compatible with most existing wafer saws and requires a minimum of saw modification during installation. If desired, a combination of two or more transducers can be used to measure the blade-to-boule force.

Figure 4:
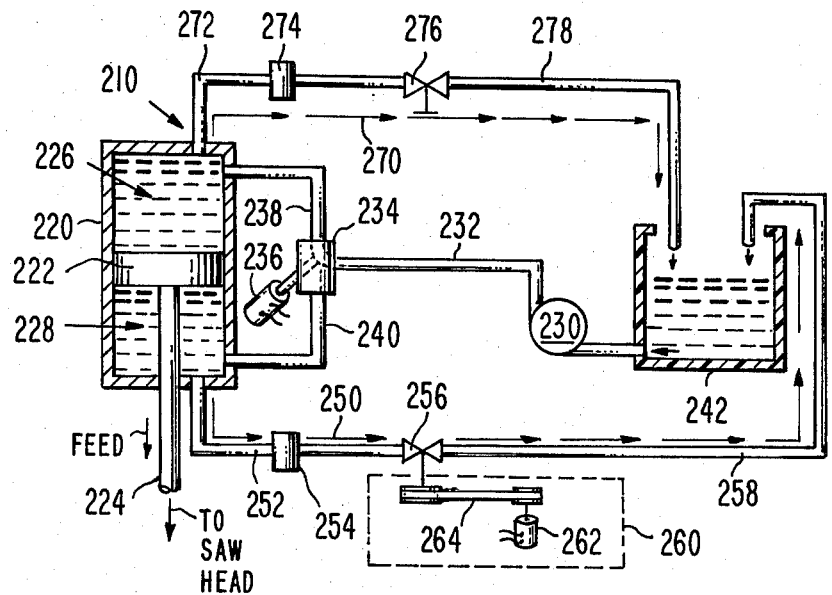
FIG. 4 illustrates a typical hydraulic feed system for a wafer saw.

A saw positioning system 210 which is typical of hydraulically driven wafer saws which have a constant rate of feed throughout a cutting cycle is illustrated in FIG. 4 and has added to it an adjustment means 260 in accordance with this invention. A hydraulic cylinder 220 contains a positioning piston 222 which carries a piston rod 224 which transmits the motion of piston 222 to the saw head (not shown). Piston 222 divides hydraulic cylinder 220 into two separate chambers 226 and 228, each of which contains hydraulic fluid. Chamber 226 may be referred to as a feed chamber or as a feed drive chamber, since introducing hydraulic fluid under pressure into chamber 226 moves piston 222 downward in the figure and feeds the saw blade into the boule. Similarly, chamber 228 may be referred to as a retraction chamber or as a retraction drive chamber, since introducing hydraulic fluid under pressure into chamber 228 moves piston 222 upward in the figure and retracts or withdraws the saw blade from the boule. Hydraulic fluid under pressure from pump 230 is supplied to the hydraulic cylinder 220 through a pressure line 232 and a directional control valve 234 which is preferably operated by a solenoid 236. In accordance with the setting of directional control valve 234, the hydraulic fluid passes from control valve 234 either through a feed pressure line 238 into feed drive chamber 226 (as shown in phantom) or through a retraction pressure line 240 into retraction drive chamber 228. When directional control valve 234 is set to the feed position in which hydraulic fluid under pressure is fed to feed drive chamber 226, the hydraulic fluid in retraction drive chamber 228 is allowed to return to the hydraulic fluid sump 242 through a feed return path 250 comprised of a return line 252, a feed return valve 254, a feed flow control valve 256 and a drain line 258 to the sump 242. The valve 254 is preferably solenoid operated simultaneously with the directional control valve 234 and may be driven by the same solenoid and may have a common shaft. Feed flow control valve 256 is normally hand operated in this type of wafer saw in order to set the constant feedrate of the saw to a desired value. The present invention adds an adjustment means 260 to this system to adjust flow control valve 256 to regulate the return flow of hydraulic fluid. Adjustment means 260 comprises a reversible stepping motor 262 and a drive belt 264 which together set valve 256 in order to control the rate at which fluid returns to the sump from the retraction drive chamber 228. This controls how fast piston 222 can move to feed the saw blade into the boule. Opening of the feed flow control valve 256 wider increases the rate of feed of the saw blade and consequently increases the blade-to-boule force. Partially closing valve 256 reduces the rate of feed of the saw blade and consequently decreases the blade-to-boule force. This feedrate control is illustrated as being digital by virtue of the use of a stepping motor, however, analog controls may also be used.

During retraction of the saw when the fluid under pressure is fed through retraction line 240 into retraction drive chamber 228, the hydraulic fluid in feed chamber 226 is allowed to return to the sump 242, a retraction return path 270 comprised of a return line 272, a retraction return valve 274, a retraction flow control valve 276 and a drain line 278 to the sump 242. Feed return valve 254 is closed during retraction of the saw. Retraction valve 274 is closed durng the feeding of the saw. Retraction return valve 274 is preferably operated simultaneously with directional control valve 234 and may be controlled by the same solenoid. Retraction flow control valve 276 is hand set to establish the desired retraction rate. Valve 276 is hand set rather than being electrically adjusted because there is wide latitude in the blade retraction rate since there should be no blade-to-boule force $F_y$ to distort the blade during retraction.

Figure 5:
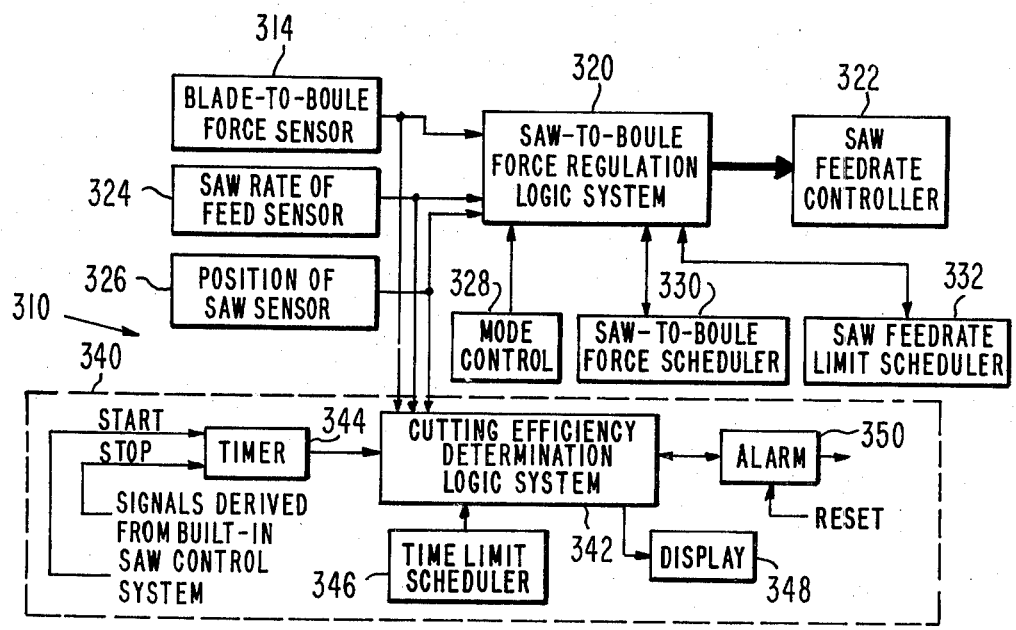
FIG. 5 is a block diagram illustration of a preferred blade-to-boule force control system.

A preferred saw force control system in accordance with the invention is illustrated generally at 310 in FIG. 5, in block diagram form. A blade-to-boule force sensor 314 measures the force applied by the saw blade to the boule being sliced. Sensor 314 may include an amplifier if the sensor signal would otherwise be too weak to be utilized in the remainder of the control system. The signal from force sensor 314 is supplied to one of the inputs of a blade-to-boule force regulation logic 320. The output signal from logic system 320 is supplied to a saw feedrate controller 322 which controls the feedrate of the saw in accordance with the instructions from logic system 320. In the hydraulic system of FIG. 4 stepping motor 262 and drive belt 264 and valve 256 constitute a saw feedrate controller 390.

A saw rate of feed sensor 324 measures the rate of travel of the saw blade into the boule and provides a signal representative thereof to a second input of the force regulation logic system 320.

A saw position sensor 326 senses the position of the saw, that is, the degree to which the saw blade has penetrated the boule and provides a signal representative thereof to a third input of force regulation logic system 320. Alternatively, this information may be obtained by integrating the feedrate data.

Other inputs to the force regulation logic system 320 are provided from a mode control 328, from a blade-to-boule force scheduler 330 and a saw feedrate limit scheduler 332.

The mode control 328 determines whether or not the force regulation system is on. The blade-to-boule force scheduler 330 specifies the target or scheduled force which is compared with a force sensed by force sensor 314 in determining whether to increase or decrease the rate of feed of the saw. The saw feedrate limit scheduler 332 specifies the maximum feedrate and the value set by it is compared with the saw feedrate sensed by sensor 324 to determine whether the saw rate of feed is too high and must be reduced, and whether force regulation logic system 320 is permitted to increase the saw feedrate if it determines that the force sensed by sensor 314 is less than the target force specified by force scheduler 330.

The saw force control system further includes a cutting efficiency determining system 340. System 340 includes cutting efficiency determination logic 342, a cutting cycle timer 344, a cutting cycle time limit scheduler 346, a display 348 and an alarm 350. Display 348 and alarm 350 may be viewed as being part of the cutting efficiency determining system, or as being separate from it and responsive to it. Timer 344 is reset and started at the beginning of a wafer slicing cycle and is turned off at the end of the cycle in response to signals derived from the main saw control system. A single pass of the saw through the boule constitutes a wafer slicing cycle. In the preferred embodiment the timer start signal is the pulse provided to directional solenoid 236 to set directional valve 234 to the feed position. Once the saw has cut through the wafer and reaches the innermost limit of travel to which it is set, a micro switch or other mechanism provides a control signal to the saw's built-in control system indicating that the cutting cycle is finished. In response to that signal, the saw's built-in control system immediately produces a control pulse which activates the directional solenoid to switch directional control valve 234 to the retract position and to open retraction valve 274 and close feed return valve 254. This pulse is used as the timer stop pulse. Thus, upon completion of the wafer sawing cycle the timer has stored therein the length of time required to cut the most recent wafer. If there was a variable delay between the cutting-cycle-finished signal and the pulse to the directional solenoid, then preferably the stop signal would be the cycle-finished signal. The time required to slice a wafer is a measure of the overall cutting efficiency of the saw over a complete wafer slicing cycle and the time to cut a wafer is used as a criterion for determining when the saw blade needs to be dressed or replaced. The setting of the time limit scheduler 346 determines the lower limit on cutting efficiency. The time actually selected as the maximum time can be a compromise between having the blade in superior cutting condition during wafer slicing and too frequent dressing of the blade to retain such a superior cutting edge. Both the timer output and the time limit scheduler output are provided to cutting efficiency determination logic 342 which compares then and determines whether the actual time to slice the wafer exceeds the limit set by scheduler 346. If the actual time is greater, then logic 342 activates alarm 350. In addition, the time to slice the most recent wafer is also displayed on display 348. Thus, this system generates both continuous (analog) and discrete (digital) cutting efficiency data. The analog data is in the form of time-to-slice a wafer data. The digital data is in binary form—alarm output off or on.

The minimum saw feedrate during the slicing of a given wafer is also a measure of the condition of the saw blade, since that minimum feedrate reflects how slowly material is being removed from the wafer with a constant blade-to-boule force of the predetermined amount when the contact arc has a maximum length. Thus, if desired, the minimum saw feedrate during a wafer slicing cycle can be used as a criterion for determining when the blade needs to be dressed in place of the time-to-slice-a-wafer criterion utilized in the preferred embodiment.

Where instantaneous efficiency information is desired, the output signals from feedrate sensor 324, force sensor 314 and position sensor 326 are also provided to efficiency determination logic 342. With these three pieces of data, logic 342 can determine instantaneous cutting efficiency either from equations or via table look up techniques or a combination thereof. Here again, lower limits on efficiency may established and alarm 350 activated when they are not met.

If only overall efficiency data is desired or only instantaneous efficiency data is desired, the components of the other system may be omitted if the data they provide is not needed for other purposes. Further, if so desired, just timer 344 and display 348 may be used to determine and communicate cutting efficiency information. The saw operator would then be instructed to check the display regularly and to dress the blade whenever the displayed time is greater than a specified amount.

If a constant feedrate or a predetermined pattern of saw feed speed is utilized, then cutting efficiency can be monitored by measuring the blade-to-boule force at a particular saw position. The preferred position for such a blade-to-boule force measurement is the location where the blade-to-boule force is greatest. In this way, an excessive force signal can be generated when the force exceeds a predetermined force level, such as 2 lbs.

Alarm 350 signals an alarm condition upon receipt of a signal from logic 342 which indicates that the cutting efficiency has fallen below an established limit and the saw blade needs to be dressed or replaced. The effect of the output of alarm 350 depends on the system configuration and may be the illumination of a warning light, the activation of an audible alarm or the cessation of saw operation until the alarm is reset. This alarm may be referred to as a cutting efficiency alarm because it is activated when the cutting efficiency of the saw blade has fallen below a predetermined limit.

If the alarm interrupts saw operation, then in order to be able to maximize wafer output, it is desirable to provide an interruption override or a separate reset of the interruption aspect of the alarm. The override or separate reset enables the saw to continue slicing wafers if the operator activates the override when he is busy with other duties and cannot dress the blade immediately.

As with most feedback control systems, it is preferred to build some hysteresis into this force regulation system in order to prevent the system from oscillating. Consequently, hysteresis amounts are preferably associated with the blade-to-boule force and with the feedrate when the feedrate is near the established maximum value the blade-into-the-boule feedrate. The size of these hysteresis amounts depends on the control precision desired, the sensitivity of the force and feedrate sensors and the courseness of the feedrate control.

The maximum feedrate scheduler 332 may be omitted, if desired. Its function of limiting the saw feedrate to a desired maximum value which is non-detrimental can be satisfied by placing a hand adjusted flow control valve in series with the automatically adjusted feed flow control valve 256 to limit the actual feedrate when feed flow control valve 256 is wide open. However, this is considered less desirable than a scheduled feedrate limit which is under the control of force regulation logic 320 because with a hand adjusted valve, the control system 320 can open feed flow control valve 256 so wide open in attempting to increase the blade-to-boule force to within the hysteresis amount of the scheduled force that, once the blade contacts the boule, the valve 256 cannot be closed fast enough to prevent the application of an excessive blade-to-boule force. Further, with a scheduled feedrate limit, the limit can be high while the saw is far from the boule and can be decreased as the position sensor 326 indicates that the saw is approaching the boule so that excessive force does not result from minimizing the pre-contact feed time.

If the maximum feedrate scheduler 332 is omitted, and saw feedrate data is not needed for other purposes, then saw rate of feed sensor 324 can be omitted. The saw position sensor 326 may be omitted if the saw position is determined by integrating the saw feedrate data or if saw position data is not needed.

The presently preferred control system omits saw position sensor 326 and has a blade-to-boule force scheduler 330 which specifies a constant predetermined force (maximum-also target force), has a saw feedrate limit scheduler 332 which specifies a fixed maximum feedrate, has a display 348 which displays the time taken for the most recent completed wafer slicing cycle, has a time limit schedule 346 which specifies a fixed predetermined time limit and has an alarm 350 which illuminates a warning light when the time to saw a wafer as measured by timer 344 exceeds the limit specified by scheduler 346. The display of the time taken for the most recent completed wafer slicing cycle serves at least three purposes. First, it allows an operator to determine the present condition of the saw blade based on the length of the wafer slicing cycle. Second, this allows an operator to prepare ahead of time for dressing the saw blade, thereby minimizing the down time of the saw. Third, it provides a check on the proper operation of the alarm system since a displayed time in excess of the maximum time set would be apparent to the operator upon checking this display. The preferred mode control has two positions, a saw's built-in control system position and a constant force control system position. When the mode control is in the saw's built-in control system position the saw operates under the control of its internal control system as through the control system of the present invention were not present. When operated in the constant force mode, the blade-to-boule force is controlled by the control system of the present invention via automatic adjustment and readjustment of the feed flow control valve 256.

There are three conditions which can occur during a wafer slicing cycle which will cause the saw feedrate to be adjusted. First, when logic system 320 determines that the measured blade-to-boule force exceeds the maximum established by force scheduler 330, logic system 320 instructs the feedrate controller 322 to reduce the feedrate of the saw.

Second, when logic system 320 determines that the measured saw feedrate exceeds the maximum established by feedrate scheduler 332, logic system 320 instructs the feedrate controller 322 to reduce the feedrate of the saw.

Third, when logic system 320 determines (1) that the measured blade-to-boule force is less than the maximum established by the force scheduler 330 by an amount which is greater than the force hysteresis amount and (2) that the feedrate is less than the maximum feedrate established by feedrate scheduler 332 by an amount which is greater than the feedrate hysteresis amount, then logic system 320 instructs saw feed controller 322 to increase the saw rate of feed.

If none of the above three conditions exist, then no feedrate change instructions are issued until the conditons change enough that one of the above criteria for changing the feedrate does occur.

The blade of a wafer slicing saw is dressed by cutting into or through a stick of abrasive material to remove from the saw blade both some of the matrix in which the diamonds of the cutting edge are embedded and some of the diamonds. This exposes new diamonds as the cutting surface of the blade. Unfortunately, merely dressing the blade is not an assurance that the cutting efficiency of the blade will increase. At times, the diamonds which are exposed by dressing the blade are ones which do not cut efficiently, either because of their basic shape or their orientation within the matrix. The saw feed control system of the present invention provides a means of determining the success of a dressing operation. Thus, rather than cutting a set number of wafers between dressings, the machine will signal when the blade needs to be dressed, no matter whether that is after one wafer has been cut or after one hundred wafers have been cut.

Monitoring of the saw force and feedrate during dressing of the blade provides a means of determining the present cutting efficiency of the blade during dressing and allows the dressing to be terminated as soon as a good cutting edge is achieved. A blade which is cutting efficiently uses less force at a fixed feedrate, or a faster feedrate at a fixed force. Blade dressing monitoring is best done with the force sensor mounted as in FIG. 3, since it avoids the need to mount the dressing rod in the boule chuck in order to monitor the saw force. Such a dressing-success measuring ability has not previously been available. Thus, blade dressing has been more of an art than a science. With the newly provided dressing control available, the useful life of saw blades (as measured by number of high quality wafers sliced) can be substantially increased because over dressing can be avoided. Even in the absence of blade force monitoring during blade dressing, the inventive control system can be expected to increase the number of high quality wafers which may be sliced with a given saw blade during its lifetime because the control system enables the saw operator to dress the saw blade at an optimum time.

In the present invention, as the conditon of the cutting edge of the saw deteriorates, the blade-into-the-boule feedrate decreases in order to maintain the scheduled force, consequently, the time it takes to slice a wafer from the boule increases. Thus, the quality of the sliced wafers is maintained substantially constant at the expense of reduced wafer output.

In the prior art saw control systems designed to produce a constant saw feedrate or a predetermined varying saw feedrate designed to produce a constant rate of silicon removal from the boule, the saw feed conditions are maintained constant independent of the condition of the saw blade. Consequently, the blade-to-boule force increases as the cutting edge of the saw deteriorates which causes a steady decrease in the quality of the sliced wafers, with the rate of quality decrease increasing as the blade-to-boule force increases. Thus, in these prior art systems, the wafer output is maintained constant at the expense of reduced wafer quality.

The saw feed control system in accordance with the invention has a number of advantages over prior art systems. First, by controlling the force applied to the saw blade during cutting, the system prevents the blade from being damaged by the application of excessive force. Thus, this system prevents permanent damage to the saw blade. Second, the wafers being sliced cannot be damaged by saw warpage caused by excessive force. Third, the system provides a means of determining the present condition of the saw blade during wafer production, and thus of determining when the blade needs to be dressed. Fourth, since control of the feedrate of the saw to maintain the desired force results in a decreasing output as the condition of the cutting edge of the blade deteriorates, the system provides a production incentive for a wafer slicing department to keep the blades of its saws properly dressed and to replace the blades when they are worn out, in order to maintain high production. Fifth, the availability of a monitoring system for the dressing operation should extend the useful life of a saw blade.

Since we are saw users rather than saw manufacturers, the preferred embodiment is structured as an add-on to existing saws having hydraulically fed saw blades, with a minimum of intrusion into the existing control system (to sense two control pulses). In the event of inclusion of this invention into a saw at the manufacturing level, the system configuration may be significantly changed without departing from the scope of this invention. The invention is applicable to any wafer saw, without reference to the method of saw feed.

The discussion of the inventive control system has been in connection with the slicing of silicon wafers from silicon boules because that is the field of primary interest to the inventors. However, it will be recognized that this control system will produce substantial improvements in the slicing of wafers of other materials, especially monocrystalline semiconductors and monocrystalline substrates such as gadolinium gallium garnet, and is not limited to these specific materials, but is applicable to wafer slicing in general.

What is claimed is:

1. In a wafer saw for slicing thin wafers from a boule of source material in which said saw has a saw blade which revolves at high speed for slicing wafers from said boule; said saw holds said boule stationary during the slicing of each wafer; said saw translates said revolving saw blade to cause the cutting surface of said blade to penetrate said stationary boule to slice a wafer from said boule by removing boule material which attaches said wafer to the remainder of said boule and said boule and said saw has a control system for controlling the rate of translation of said blade, the improvement comprising:
   means for regulating the blade-to-boule force urging said blade of said saw into said boule during the slicing of wafers to improve the as-sawn quality of the wafers, said means for regulating comprising:
   force sensing means for sensing the blade-to-boule force urging said blade of said saw into said boule;
   said force sensing means comprising a transducer fixed to said stationary boule for sensing said blade-to-boule force;
   force reference means for establishing a desired pattern of blade-to-boule force;
   force comparator means for determining whether said sensed blade-to-boule force exceeds said desired blade-to-boule force and for determining whether such sensed blade-to-boule force is less than said desired blade-to-boule force by more than a desired force-hysteresis amount;
   control means for decreasing the feedrate of said saw blade into said boule when said force comparator means produces an output indicating that said sensed blade-to-boule force is greater than said desired blade-to-boule force and for increasing said feedrate when said comparator means produces an output indicating that said sensed blade-to-boule force is less than said desired blade-to-boule force by an amount which is greater than said desired force hysteresis amount.

2. The improvement recited in claim 1 wherein the maximum desired blade-to-boule force is less than 4 pounds.

3. The improvement recited in claim 1 wherein said saw blade is a thin annular disk with the cutting edge on the inner periphery thereof.

4. The improvement recited in claim 1 wherein said force reference means is adapted to establish a constant desired force.

5. The improvement recited in claim 1 wherein said desired pattern of blade-to-boule force is a function of at least one variable selected from the group consisting of the saw blade position, feedrate of said saw blade, and the desired quality of as-sawn wafers.

6. The improvement recited in claim 5 wherein said force reference means is adapted to establish a desired force which is a function of the saw blade position.

7. The improvement recited in claim 1 further comprising:
   feedrate sensor means for sensing the feedrate of said saw; and
   position determining means for determining the position of said saw blade and wherein said force reference establishes a desired force which is a function of at least one of the variables selected from the group consisting of: saw position, feedrate of said saw, saw-to-boule force and the desired quality of the as sawn wafers.

8. The improvement recited in claim 1 further comprising:
   feedrate sensor means for sensing the feedrate of said saw;
   feedrate reference means for establishing a maximum desired feedrate;
   feedrate comparator means for determining whether said sensed feedrate is greater than said maximum desired feedrate and for determining whether said feedrate is less than said maximum desired feedrate by an amount which is greater than a desired feedrate-hysteresis amount; and wherein:
   said control means decreases said feedrate when said feedrate comparator produces an output indicating that said sensed feedrate is greater than said maximum desired feedrate, even if so doing decreases said blade-to-boule force to less than said desired blade-to-boule force minus said desired force-hysteresis amount; and
   said control means does not increase said blade-to-boule feedrate when said feedrate is between said maximum desired feedrate minus said desired feedrate-hysteresis amount and said maximum desired feedrate, even though said force comparator output indicates that said sensed blade-to-boule force is less than said desired blade-to-boule force by an amount which is greater than said desired force-hysteresis amount.

9. The improvement recited in claim 1 further comprising:
   means for determining the cutting efficiency of said saw.

10. The improvement recited in claim 9 wherein said means for determining the cutting efficiency of said saw comprises:
    timer means for measuring the length of time required to slice a wafer from said boule.

11. The improvement recited in claim 10 further comprising:
    display means for displaying the time required to slice a selected wafer.

12. The improvement recited in claim 10 wherein said means for determining further comprises:
    time reference means for establishing a desired maximum time-to-slice-a-wafer; and time comparator means for determining when said measured time-to-slice-a-wafer is greater than said desired maximum time-to-slice-a-wafer.

13. The improvement recited in claim 8 further comprising:
means for determining the cutting efficiency of said saw, said means for determining the cutting efficiency comprising:
position sensing means for determining the position of said saw blade; and
logic means for determining the cutting efficiency of said saw from the measured position of said saw, the measured blade-to-boule force and the measured feedrate of the saw, said logic means producing an output which is a measure of the cutting efficiency of said saw.

14. The improvement recited in claim 10 or 13 further comprising:
alarm means response to said cutting efficiency determining means for signaling when said cutting efficiency determining means produces an output indicating that said measured cutting efficiency fails to meet a standard for minimum cutting efficiency.

15. The improvement recited in claim 14 wherein:
said alarm means prevents said saw from automatically slicing another wafer from said boule until after at least the prevention aspect of said alarm has been reset.

16. The improvement recited in claim 1 wherein the maximum desired blade-to-boule force is less than 3 pounds.